United States Patent Office 3,281,651
Patented Oct. 25, 1966

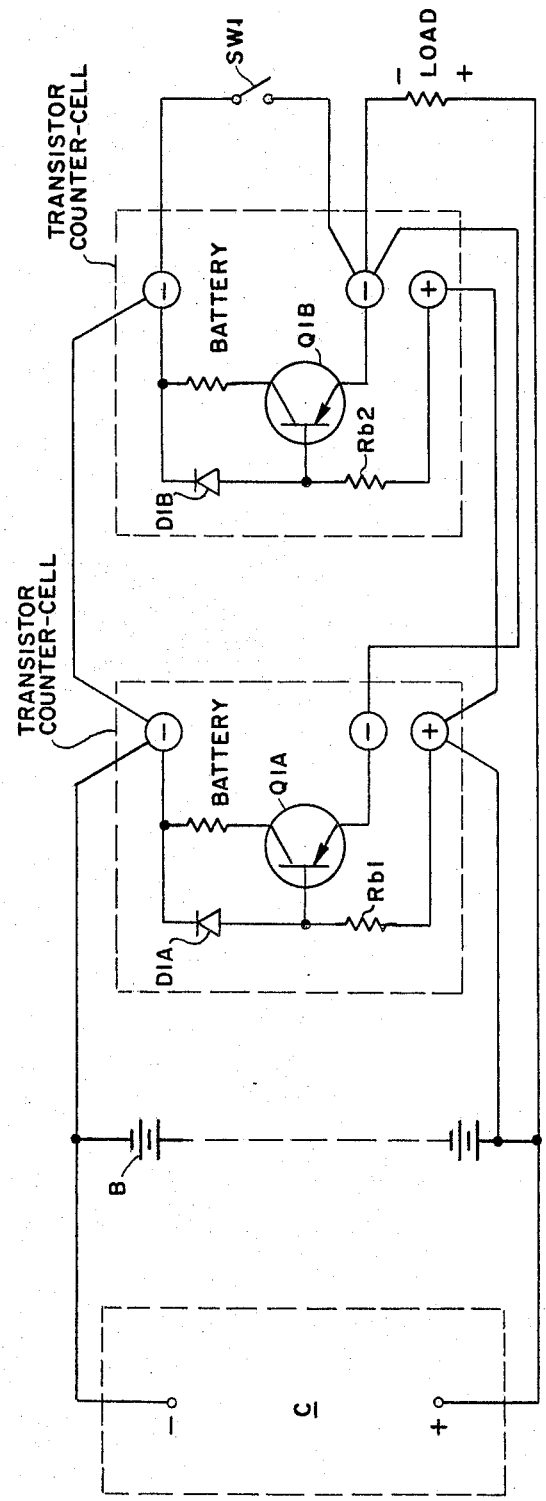

3,281,651
COUNTER E.M.F. CONTROL SYSTEM
John S. Contino, South Acton, and Earl C. Rhyne, Jr., Millis, Mass., assignors to The Warren Manufacturing Company, Inc., Littleton, Mass., a corporation of Massachusetts
Filed Feb. 5, 1962, Ser. No. 170,934
9 Claims. (Cl. 323—16)

Our invention relates to counter-electromotive force (E.M.F) voltage control systems, and particularly to such systems using selectively operable counter-E.M.F. cells which conventionally impose a constant voltage drop between a variable source such as a discharging battery and a heavy load such as a telephone system.

Counter-E.M.F cells, or counter-electromotive force cells, find their most frequent use in telephone power supply systems to regulate the direct voltage output from the conventional battery power source as the battery discharges and changes its terminal voltage. They serve to absorb or buck out fixed values of the excess voltage associated with telephone equipment energizing batteries when appropriate charging generators maintain the "float charge" voltage upon the battery. In the event of a voltage drop at the terminals of these batteries, occasioned by failure of the charging generators or overload, heavy switches short the counter E.M.F. cells and effectively restore the voltage output to the load. Another important function of counter E.M.F. cells is to absorb or buck out the excess voltage which must be added occasionally to charge the batteries. This charging voltage may be referred to as "equalize-charge" voltage, as differentiated from a float charge voltage which normally floats across the batteries to maintain their charge.

Counter E.M.F. cells are used because other means of regulation are generally unsuitable for high current telephone circuits. For example, it would be harmful to connect switches across individual battery cells and to selectively short them out for regulating the voltage. Also it would be incommodious to disconnect the load from the terminal at the outer cell of the battery and to reconnect it at another cell because this would result in interrupted service. Moreover, regulation of voltage by opening cells and closing different circuits in a telephone office introduces serious surges in the telephone talking circuits and imposes surges on the equipment tied into the battery bank.

Conventionally, a multiplicity of series-connected counter-E.M.F. cells connect the battery bank with the load, and contactors across each counter-E.M.F. cell switch discreet increments of voltage in and out as required by the load voltages. When the battery is fully charged, or when an equalizing charge voltage is applied to the battery, all the counter-E.M.F. cells are connected into the circuit. As the battery discharges particular ones of the cells are shorted out to maintain the voltage at the load until the end of a discharge cycle when the counter-E.M.F. cells are all shorted out.

The two most common types of counter-E.M.F. cells available are wet cells which comprise a solution of caustic soda through which load current passes, and dry cells or selenium rectifiers. Each type of cell exhibits some degree of dynamic impedance which results in a limited amount of increase in voltage drop as a function of increase in load current; and both types are characterized by requiring large power switches for shorting the cells. There are various kinds of counter-E.M.F. cells of the wet type, which are used for such applications. These wet type counter-E.M.F. cells cannot generate any voltage, although they are capable of producing a counter voltage when current flows through them. The counter-E.M.F. cell according to our invention actually has a use that is comparable to these so called wet type counter-E.M.F. cells. It should be noted that the wet type counter-E.M.F. cells can be shorted without any violent reactions.

It is an object of this invention to provide an improved system permitting selective control of a voltage across a load without interruption of service and utilizing new and improved counter-E.M.F. cell circuits.

It is a further object of this invention to provide a counter-E.M.F. cell permitting use of comparatively light switches for connecting or disconnecting the counter cells.

Another object of the invention is to provide a counter cell system which provides a degree of immunity to current surges and wherein the counter-E.M.F. cells display a constant potential drop, over a large and useful range.

According to our invention, we connect, between a source and a load, the emitter-collector circuit of one or more transistors, thus forming a unidirectional series path of major current flow from source to load, and we provide biasing current for the emitter-base circuits of the transistor or transistors by connecting their respective bases to a potential or potentials intermediate the source voltage terminals, thereby effecting one or more potential drops or counter E.M.F.'s between source and load. We then also provide switch means for selectively eliminating the voltage drop or portions of the voltage drop between the source and load.

Other objects and advantages of the invention as well as the novel features by virtue of which they are achieved, these features being set forth in particularity hereinafter, will be apparent from, and will be mentioned in the following description with reference to the drawings wherein:

FIG. 1 is a schematic representation of a supply system for a telephone exchange which embodies the features of the invention;

FIG. 2 schematically illustrates a further embodiment of the supply system of the invention, wherein the counter-E.M.F. cells display a substantially constant potential drop over their useful range, and wherein the counter-E.M.F. cells can sustain current surges;

FIG. 3 schematically illustrates another telephone power supply embodying the features of the invention;

FIG. 4 schematically illustrates a supply embodying a feature of the invention;

FIGS. 5 and 6 schematically illustrate other supplies which embody features of the invention;

Figure 1:
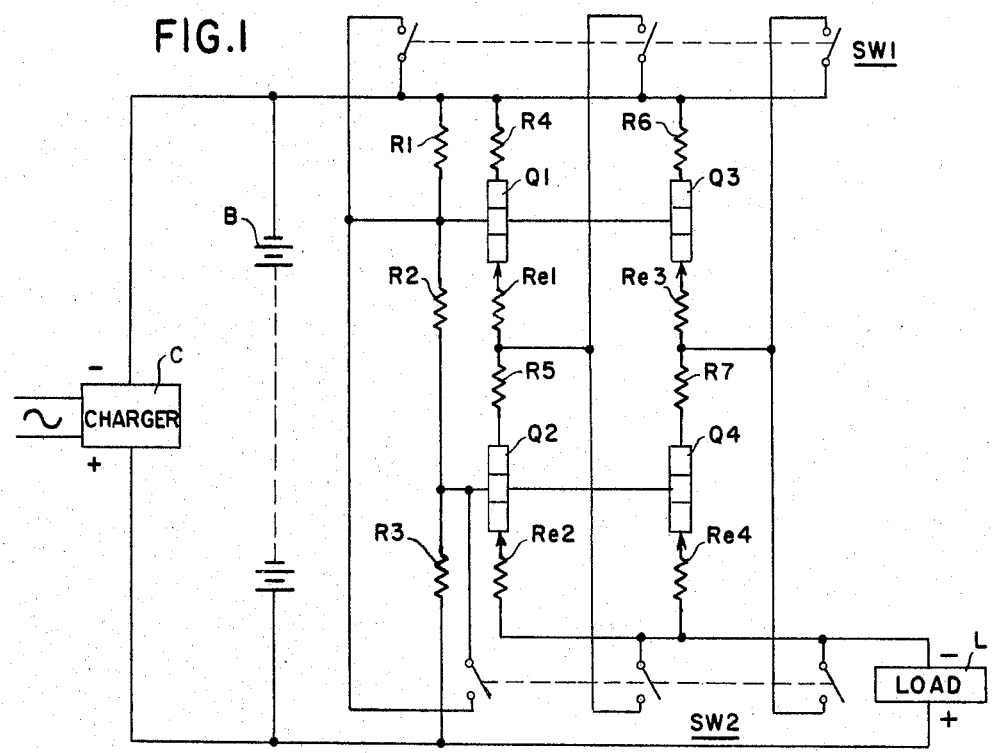

In FIGS. 1 to 6, showing different embodiments of the invention, a battery B, comprising a plurality of cells to form a bank receives charge from a direct current charger or charging generator C and supplies power, by way of a transistorized counter-E.M.F. system, to a load L representing a central telephone exchange system. The charger C receives power from a commercial 110 volt single-phase or 230 volt 3-phase power source. In FIG. 1 the counter-E.M.F. system includes three serially connected resistors R1, R2 and R3 forming a voltage divider across the battery source B. The intermediate potentials at the junctions of resistors R1, R2 and R3 provide bias-current sources for PNP transistors Q1, Q3 and Q2, Q4 respectively. Collector resistors R4 and R6, each .1 ohm, connect the negative terminal of the battery B to the collectors of the transistors Q1 and Q3 respectively. Two .02 ohm emitter resistors Re1, Re3 connect the emitters of the transistors Q1 and Q3 respectively to .1 ohm collector resistors R5 and R7 of the transistors Q2 and Q4. The respective emitters of the transistors Q2, Q4 respectively connect to .02 ohm emitter resistors Re2 and Re4 which provide a direct connection to the load L. The emitter-collector circuits of the transistors Q1, Q2, along with the resistors R4, Re1, R5, Re2 constitute two corresponding E.M.F. cells. They form a unidirectional path of major current flow from the load L to the negative terminal of the battery B and produce a base-bias determined voltage drop from the negative terminal of the battery B to the load negative. The values of resistors R4, Re1 and R5, Re2 also serve to determine the voltage drop from the battery B to the load negative. The resistors R6, Re3, transistor Q3, the resistors R7, Re4 and the transistor Q4 respectively constitute two more counter-E.M.F. cells and form a second path of major current flow between the negative terminal of the battery B and the load. The second path is substantially parallel to the first path defined by transistors Q1 and Q2 and the elements associated therewith. The transistors Q3 and Q4 are substantially identical to the transistors Q1 and Q2 and have their bases connected to the bases of transistors Q1 and Q2 respectively, so as to be correspondingly biased.

The second path of major current flow defined by transistors Q3 and Q4 and the elements associated therewith carries half of the load current passing between the battery B and the load. Because transistors Q3, Q4 and resistors R6, F7, Re3, Re4 are substantially identical with the transistors Q1, Q2 and resistors R4, R5, Re1, Re2, the second parallel path will provide substantially the same voltage drop as provided by the first path. Each path permits a major current flow of 8 amperes; that is to say 8 amperes flow in each paralleled transistor.

A three-pole-single-throw switch SW1 possesses three armatures all connected to the negative terminal of battery B and three corresponding stator terminals; two, stator terminals connecting to the junction of resistors Re1, R5 and Re3, R7 respectively and the third connecting to the equipotential bases of transistors Q1, Q3. Preferably the switch SW1 and all switches discussed hereinafter consist of remotely controlled contactors or relays. A second three-pole-single-throw switch SW2 possesses three ganged armatures operating in unison; two connecting to the negative of load L and a third connecting to the bases of transistors Q2, Q4. Two stator terminals connected to the junction of emitter resistors Re1, R5 and collector resistors Re3, R7 respectively, and a third connected to the bases of transistors Q1, Q3, (i.e. all connected to the corresponding stator terminals of switch SW1) constitute the remainder of switch SW2. Closing of switch SW1 shorts the voltage drop provided by transistors Q1, Q3 and the associated circuit elements R1, R4, R6, Re1, Re3. Similarly, when closed, switch SW2 eliminates the voltage drop associated with transistors Q2, Q4 and the corresponding resistors R2, R3, R5, R7, Re2, Re4.

In operation, when the charger C maintains constant the voltage of battery B, the switches SW1 and SW2 are kept open and the transistor counter-E.M.F. cells exhibit a voltage drop and lower the load voltage from that of the battery B by a predetermined amount. If the voltage applied to the charger C is reduced as a result of power failure or the like, the resulting drain upon the battery B reduces the voltage at its terminals and the voltage at the load similarly decreases. When the load voltage decreases a predetermined amount, as a result of this failure or for any other reason, an automatic device closes the switch SW1 and removes the voltage drop which was previously introduced by transistors Q1 and Q3 and the associated circuits, thus suitably raising the voltage across the load L and compensating for the battery voltage decrease. When the load voltage decreases still further, the switch SW2 is closed to further raise the output voltage. The switches required to short out the circuits of transistors Q1 and Q3 as well as Q2 and Q4 are of sufficient size to carry the large load current.

Figure 2:
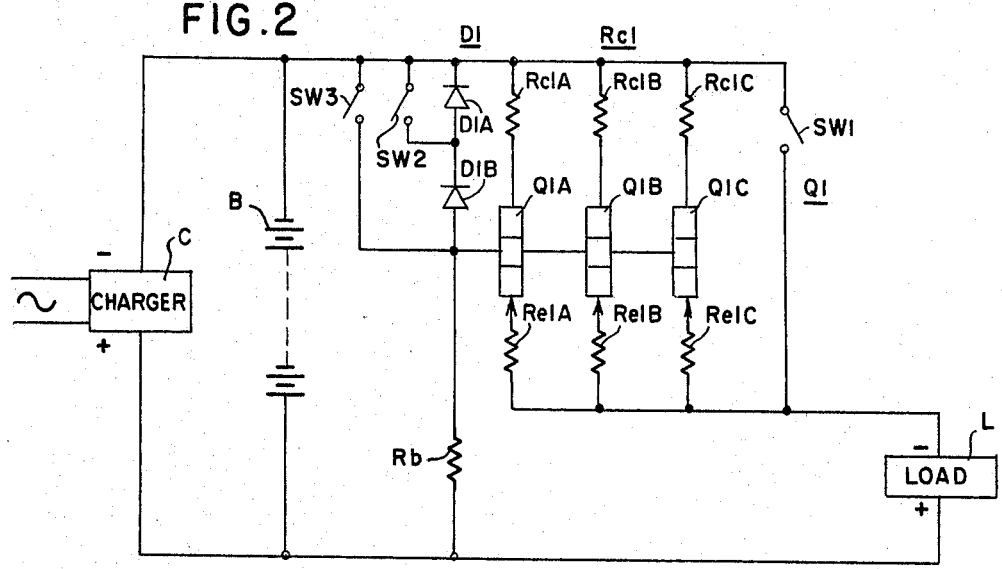

In FIG. 2, a plurality of series-connected, unidirectionally poled diodes D1A and D1B connected in series with a resistor Rb form a voltage and establish a constant positive base-biasing potential relative to the negative terminal of the battery at the resistor-diode junction divided across the terminals of the battery B. The diodes D1A and D1B, or collectively D1, shown herein are silicon rectifiers. However, it should be understood that the invention is not limited to silicon rectifiers, but contemplates other potential maintaining semiconductor devices such as Zener diodes poled oppositely to the direction shown. According to the commonly known characteristic of silicon diodes, within a range of values of current passing in the forward direction, the voltage across the diodes is relatively constant regardless of the increase in current through the diodes that might occur. It can, therefore, be assumed that in the circuit of FIG. 2, the voltage across the diodes D1A and D1B is fixed.

The emitter-collector circuit of a PNP power transistor Q1A connects load L to the negative lead of the battery B by way of a .1 ohm collector resistor Rc1A and a .02 ohm emitter resistor Re1A. This effects a counter-E.M.F. cell rating of 15 amperes in a circuit where the counter-E.M.F. voltage is somewhat greater than 2 volts. The base of the transistor Q1A receives biasing current through the junction of the resistor Rb and the diode D1B. The transistors Q1B and Q1C are connected, similar to the transistor Q1A, with collector resistors Rc1B, Rc1C and emitter resistors Re1B, Re1C respectively to the battery B, to accommodate larger D.C. load currents than could be accommodated by the single transistor Q1A. It should be understood, of course, that the invention contemplates a larger number of transistors Q1 to accommodate any suitable load current, and that the three transistors are shown for example only. The bases of all the transistors are connected to each other.

In the following explanation of the operation of the circuit in FIG. 2 the collective term "transistors Q1" will be used to include the effect of transistors Q1A, Q1B and Q1C; similarly the collective term "resistors Rc" indicates resistors Rc1A, Rc1B and Rc1C.

The symbol Re indicates emitter resistors Re1A, Re1B, Re1C. The circuit of FIG. 2 operates such that the voltage between the bases of transistors Q1 and the D.C. input voltage at the negative terminal of the battery B remain at exactly the same level as the junction of the diode D1 and the resistor Rb; which level is nearly constant relative to the negative terminal of the battery B. This voltage relationship biases the transistors Q1 into a conductive state over a wide range of load values starting just above no-load and extending beyond full-load. Because, in a conductive transistor the voltage drop across the emitter-base junction is relatively small, the emitter potential of transistors Q1, and hence the load voltage, essentially follow the value of the base potential. Accordingly the voltage drop from the negative terminal of source B, to the load, remains constant over a wide range. When the load is such that current passing through the transistors Q1 and resistors Rc, Re is low or essentially zero, the diodes D1A and D1B maintain the base potential relative to the negative terminal of the battery B at 2 volts, which is a typical value of bias voltage applied by the diodes. This base potential holds the transistors Q1 in a substantially cutoff condition, so that the entire 2 volts appear across the collector-to-base diode of the transistor and essentially no voltage drop under this condition occurs across the resistors Rc. As the load current increases due to any number of causes, so that a greater voltage drop appears across the resistors Rc, the base voltage of transistors Q1, although remaining 2 volts more positive than the negative lead of the battery B, approach the potential of the collector. Therefore, transistors Q1 turn on or conduct partially. At a value of approximately 2 volts across the resistors Rc resulting from current flow to the load, the transistors Q1 saturate. This relationship determines the full load rating of the counter-E.M.F.-cells described in FIG. 2. At load currents greater than this full load rating, the D.C. voltage drop across the resistors Rc exceeds the voltage across the diodes D1. Therefore, the constant voltage across resistors Rc and transistors Q1 cannot be maintained. Under conditions of overload, such as just described, the excessive voltage created across the resistors Rc attempts to place an excessive voltage across the diodes D1. This causes more base current to flow through the emitter resistors Re of transistors Q1, through the bases of transistors Q1, and through the diodes D1. This is precisely the relationship required for the transistors Q1 to support such an overload condition; that is when the overload current increases the base current also increases, thereby making large overload surges possible without damage to the diodes D1 or the transistors Q1. To make this overload relationship proper, the values of resistors Rc must be adjusted according to the current values required. Switch SW1 in FIG. 2 illustrates how the counter-E.M.F. cells so described can be shorted in order to manually or automatically increase the load voltage.

Prior to closing switch SW1 it is possible to recalibrate the voltage developed by the counter-E.M.F. cell by closing a switch SW2 connected across the diode D1A. This raises the negative potential at the bases of transistors Q1 and decreases the voltage drop thereacross. The switch SW2 need have a far lighter current rating than the power switch SW1 which shorts out the entire counter-E.M.F. cell circuit and carries the entire current. Switch SW2 only carries the emitter base current in transistors Q1. Another switch SW3 connects across both diodes D1A, D1B and, when closed, connects the base of transistors Q1 directly to the negative terminal of battery B thus again decreasing the voltage developed across the counter-E.M.F. cell.

Because of the electrical nature of transistors Q1 and because resistors Rc all exhibit the same value, the transistors all saturate at essentially the same load currents. Thus, the transistors Q1 share the load properly as the entire bank of parallel units enters into overload as described.

The system of FIG. 6 is comparable to that of FIG. 2 with the exception that the bases of the parallel transistors, namely Q1A and Q1B are not connected together but are individually biased by diodes D1A and D1B connected as shown to resistors Rb1 and Rb2. The resistors Rb1 and Rb2 may be dispensed with if light load condition will not occur.

Figure 3:
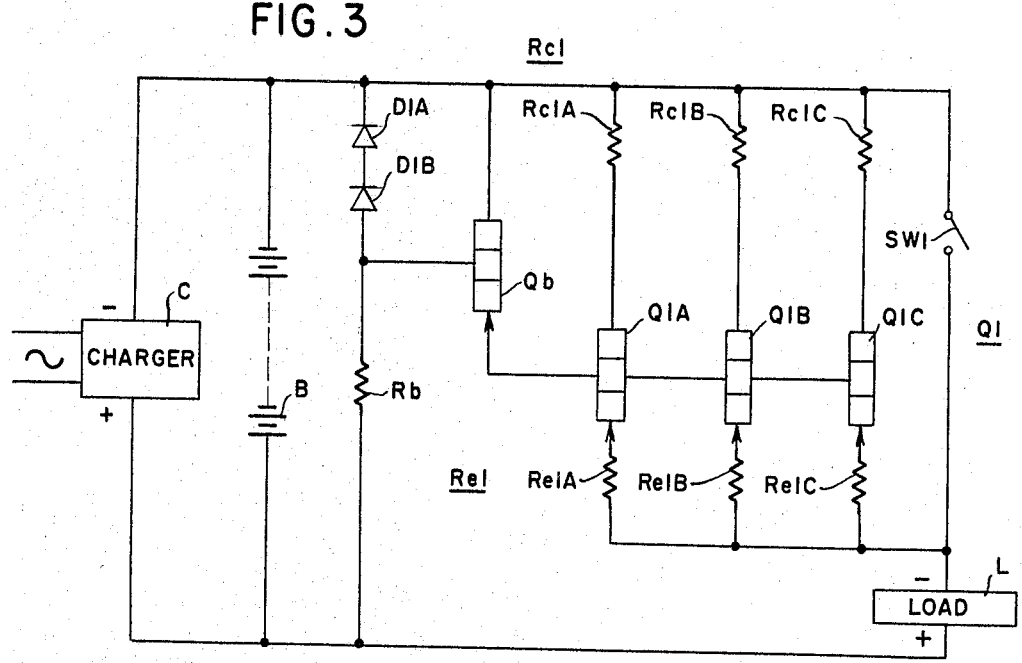

FIG. 3 illustrates a variation of FIG. 2. The pair of diodes D1A and D1B connected as in FIG. 2, provide a base-to-collector voltage for a transistor Qb. The collector thereof connects directly to the negative lead of the battery B, and thereby maintains constant the voltage drop across the base-to-collector of transistor Qb. The emitter-collector circuit of transistor Qb in turn holds constant the voltage from the base of transistors Q1 to the negative lead of battery B. In this case, transistors Q1 again consist of transistors Q1A, Q1B, and Q1C. Collector-resistors Rc1A, Rc1B, Rc1C (collectively designated Rc1) respectively connect these transistors by their collectors to the negative lead of the battery B, while the emitters of transistors Q1 connect to the load as indicated. This circuit of FIG. 3 will not tend to hold the voltage drop across resistors Rc1 and transistors Q1 as constant as that of FIG. 2 because the base-to-emitter voltages in both cases cause an error or voltage deviation which is not compensated by the diodes D1A and D1B. In the circuit of FIG. 3 there are two voltage drops which are uncompensated, namely the base-to-emitter voltage of transistors Q1 and the base-to-emitter voltage of transistor Qb. If transistors Q1 in FIG. 2 comprise only one transistor of the 25 ampere variety, surge currents up to 150 amperes for one second can be sustained regularly. The same transistors similarly connected in the circuit of FIG. 3 can sustain currents of only 60 to 70 amperes maximum under this condition because larger surges of current will short out transistors Q1. Either of the circuits of FIGS. 2 or 3 may be arranged for higher counter-E.M.F. voltages across the cells with additional series connected diodes. A switch SW1 serves to short the counter-E.M.F. cells.

In place of the silicon rectifier diodes in FIG. 3, the invention contemplates connecting a Zener diode, poled oppositely to the diode shown in FIG. 3, or any other type of suitable fixed voltage device, to establish the reference voltage in this circuit. The reference voltage produced by the Zener diode usually exhibits a voltage magnitude in multiples of two volts because 2 volts is the voltage value of most battery cells used.

The circuit of FIG. 2 can withstand very large current surges without damaging the transistors. This is so because during such large current surges the transistors Q1 saturate and the current gain or $\beta$ of transistors Q1, for example, decreases to very low magnitudes such as 2 or 3. The base current required to support the saturated condition of the transistor during this large current surge reaches the same order of magnitude as the current through the emitter-collector circuit of the transistor. Thus, the diodes D1A and D1B support a large percentage of the total current during a surge. On the other hand, other devices connected in place of diodes D1A and D1B, which will not support such large currents without damage will prevent saturation of transistors Q1 during this surge and will therefore cause the transistor to be damaged or destroyed. For example, replacement of the diodes D1 by a resistor results in a voltage across the resistor which does not remain constant, and therefore, upon occurrence of a surge, the voltage between the base of the transistors Q1 and the negative lead of the battery B increases as the base current increases. The substitution of a resistor for the diode D1 thus causes the transistor to dissipate far more power than is desirable. For that reason the embodiments using diodes are preferable to those in which they are replaced by resistors, although the latter are applicable where low-current conditions are involved.

Figure 4:
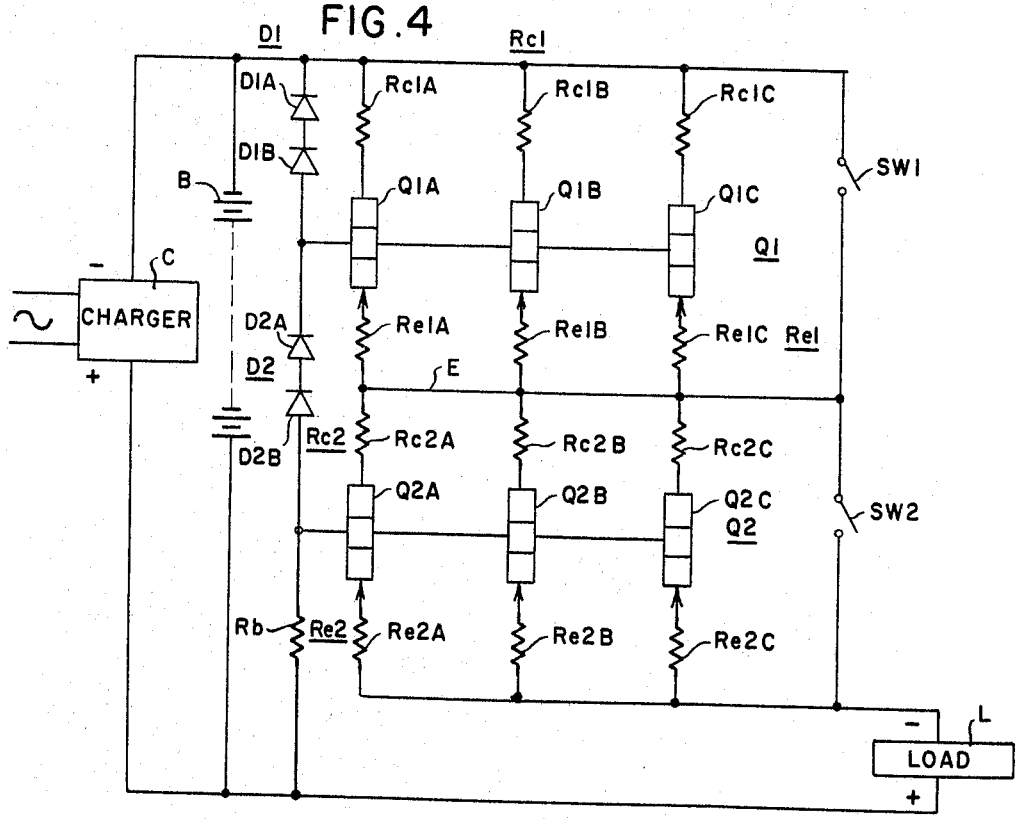

FIG. 4 illustrates another variation of the circuit of FIG. 2 employing two groups of transistors Q1 and resistors Rc1 arranged in series, and embodying features of this invention. In FIG. 4, instead of the emitter resistors Re1 of transistors Q1A, Q1B and Q1C leading to the load L as do the resistors Re in FIGS. 2 and 3, they connect to a common emitter lead E to establish a first counter-cell voltage drop. Three collector resistors Rc2A, Rc2B and Rc2C connect the lead E to transistors Q2A, Q2B and Q2C respectively, the emitters of which transistors connect to the load L through emitter resistor Re2A, Re2B, Re2C. The bases of the transistors Q1A, Q1B and Q1C receive biasing current from a potential point established by a diode D1B which is one of the pair of diodes D1A and D1B forming a constant voltage potential from the negative lead of the battery B. A second pair of serially-connected diodes D2A and D2B form a second constant voltage potential at their junction with resistor Rb. The diodes are unidirectionally poled and form a voltage divider across the battery B with the resistor Rb. The bases of transistors Q1 and transistors Q2 all connect to each other. Again in this embodiment the terms transistors Q1 and transistors Q2 designate the transistors QlA, Q1B and Q1C and transistors Q2A, Q2B, and Q2C respectively. Similarly, the resistors Rc2A, Rc2B, Rc2C; Rc1A, Rc1B, Rc1C; Re1A, Re1B, Re1C; and Re2A, Re2B, Re2C are referred to as resistors Rc2, Rc1, Re1, and Re2 respectively. The resistances Rc1 and Rc2, together with the voltage divider D1, D2, R$b$, together bias the transistors Q1 and Q2 to form a counter-E.M.F. cell in series with the counter-E.M.F. cell formed by the resistors Rc1, Re1 and transistors Q1. During surges of current, the transistors Q1 and Q2 saturate in turn. Switches SW1 and SW2 serve to short the second counter cell.

Figure 5:
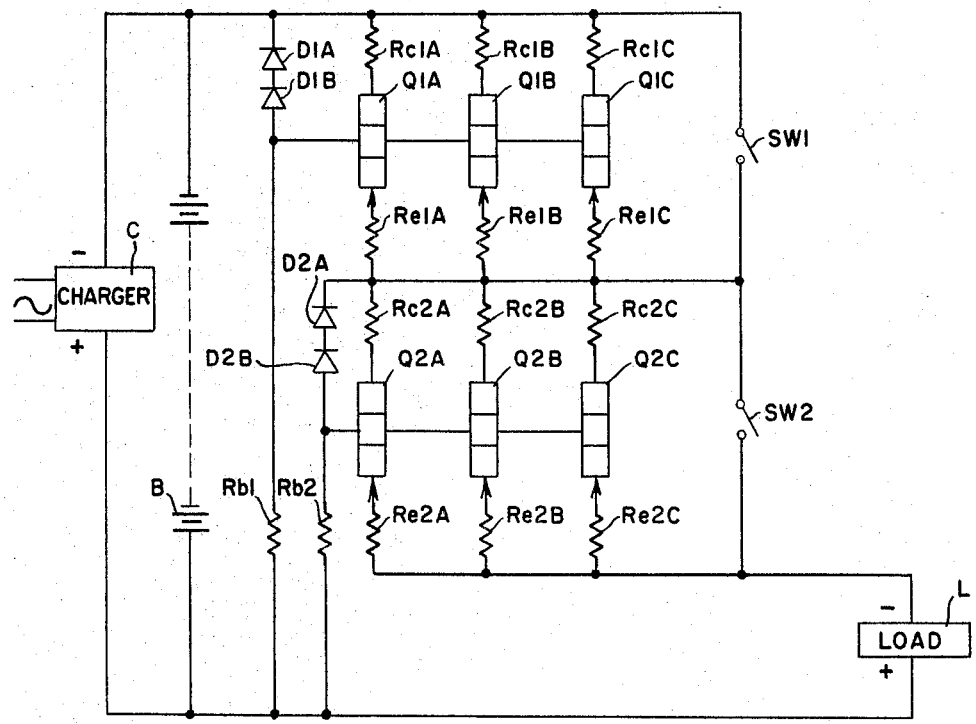

In FIG. 5, otherwise identical with the embodiment of FIG. 4, the diodes D1A, D1B, and D2A, D2B separately connect the bases of transistors Q1 and Q2 to their respective collector resistors Rc1 and Rc2. Separate base resistors R$b$1, R$b$2 supply current to the diodes D1A, D1B and D2A, D2B respectively. The base resistors R$b$1, R$b$2 are necessary only where the load current becomes very light and where the bias current is not supplied. Where a normal load current for 50 ampere counter-E.M.F. cells has been reduced to 40–60 milliamperes the voltage across the counter-E.M.F. cells could drop to zero were it not for the existence of resistors R$b$1, R$b$2; but for load currents slightly above this value the counter-E.M.F.-voltage reestablishes itself at its normal value.

Figure 7:
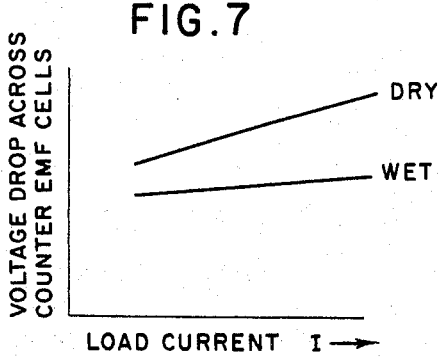
FIG. 7 shows a graph illustrating the dynamic response of presently available counter cells.
Figure 8:
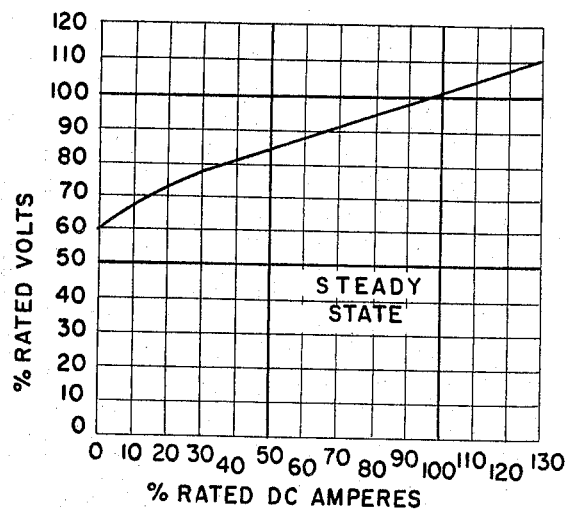
FIG. 8 is a graph showing the transistor counter-E.M.F. cell typical characteristics for the circuits in FIGS. 1 to 6.
Figure 9:
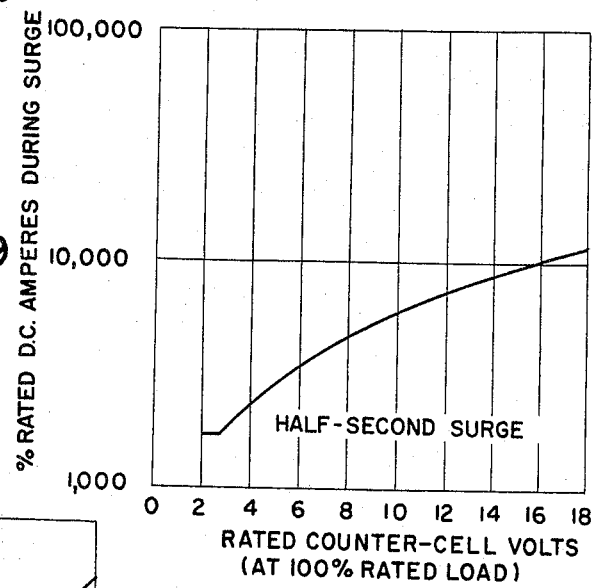
FIG. 9 is a graph showing typical surge current characteristics for transistor counter-E.M.F. cells.
Figure 10:
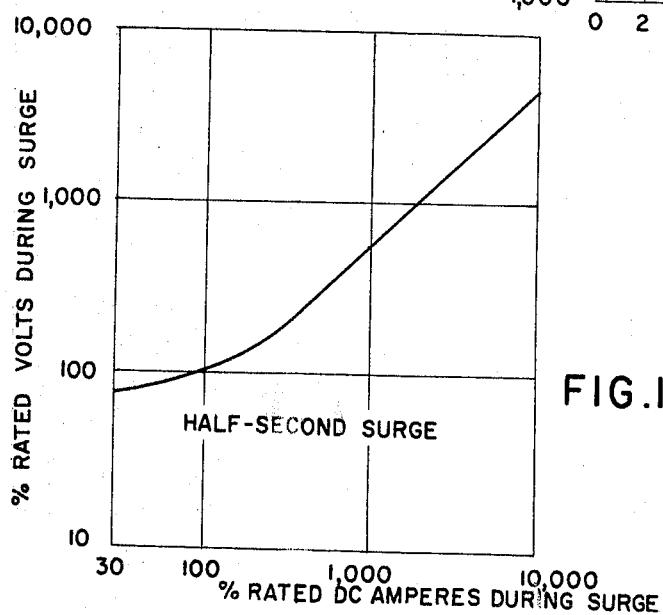
FIG. 10 is a graph showing typical transistor counter-E.M.F. cell voltages during surge currents.

The dynamic response of presently available counter-E.M.F. cells is illustrated in FIG. 7. FIGS. 8, 9 and 10 illustrate respectively, for transistor counter-E.M.F. cells, typical characteristics, typical surge current characteristics, and voltages exhibited during surge currents for 2½ volt counter-E.M.F. cells. These characteristics are chosen, that is to say, they can be varied selectively by varying the values of the cell components. For example, by varying the values of the collector and emitter resistors Rc1, Rc2, Re1 Re2, etc., as well as the characteristics of the silicon rectifier (i.e. the stabistor), the characteristics set forth in FIGS. 8 to 10 can be modified according to the requirements of the particular application. Thus, if a smaller half-cycle surge current rating is permissible in the desired application of the counter-E.M.F. cell, the voltage characteristics of FIG. 8 can be made more constant by reducing the emitter-resistor values and possibly the collector-resistor values. A more constant counter-E.M.F. cell voltage can be achieved also by merely using power transistors having a higher D.C. gain factor (i.e. $\beta$).

Typically, for constant surge current values the D.C. voltage characteristics according to FIG. 8 become more constant as the counter-E.M.F. voltage of each counter-E.M.F. cell is increased.

It should be understood that these three graphs in FIGS. 8 to 10 are interrelated. FIG. 10 is useful for determining the lowest impedance that can be tolerated in a short circuit, whereas FIG. 9 shows the maximum percentage of surge current which can be tolerated for a counter-E.M.F. cell of a given voltage rating when designed according to the characteristics of FIG. 8.

The above-described circuits each provide an improved system permitting selective control of a voltage across a load without interrupting the service and utilizing new and improved counter-cell circuits.

The flexibility of these circuits embodying the invention will be obvious to those skilled in the art. For example, the invention contemplates use of NPN transistors as well as the PNP transistors shown throughout.

It should be noted that the individual counter-E.M.F. cells are constituted of a transistor, or series of transistors, connected in parallel with their associated emitter and collector resistors as well as their biasing components. However, each counter-E.M.F. cell may also consist of several of the thus-described individual counter-E.M.F. cells connected in series.

The switch means do not necessarily form a part of the counter-E.M.F. cells. In fact, in the preferred form of the invention, the switch means are excluded from the counter-E.M.F. cell construction.

While various embodiments of the invention have been shown in detail, it should be understood that the invention is not limited thereto and may be otherwise embodied.

We claim:

1. A counter-E.M.F. cell voltage control system for connecting a direct-voltage source having two terminals to a load and for regulating a voltage drop between said source and said load, comprising midpotential means adapted to be connected to the source for producing potentials intermediate the terminal potentials of the source, transistor means having an emitter-collector circuit adapted to be connected between said source and said load and a base connected to an intermediate potential of said midpotential means for imposing between the source and the load a voltage drop, said voltage drop appearing across the emitter-collector circuit of said transistor, and switch means connected to said transistor means for selectively eliminating the voltage drop across the emitter-collector circuit of said transistor.

2. A counter-E.M.F. voltage control system for connecting direct-voltage source having two terminals to a load and for regulating a voltage drop between said source and said load, comprising midpotential producing means adapted to be connected to said source for obtaining potentials intermediate the potential of the two terminals of said source, transistor means adapted to be connected between a terminal of said source and said load for imposing therebetween a voltage drop, said transistor means including a group of transistors each having a collector and an emitter which define respective emitter-collector circuits and having their respective emitter-collector circuits connected in series and poled so as to form a unidirectional path of major current flow through the emitter-collector circuits, each of said transistors having a base connected to said midpotential producing means to bias said transistor means, said voltage drop appearing across the emitter-collector circuits of said transistors and switch means connected across each collector-emitter circuit for selectively eliminating the potential drop across each collector-emitter circuit.

3. A counter-E.M.F. cell voltage control system for connection between source means having two terminals and load means and for regulating a voltage drop between said source and said load, comprising midpotential producing means adapted to be connected to said source means for obtaining potentials intermediate the potential of the two terminals of said source means, transistor means adapted to be connected between said source means and said load means and including a collector connected to said source means and an emitter connected to said load means and a base connected to an intermediate potential in said midpotential producing means for biasing said transistor means and imposing between the source means and the load means a voltage drop when connected to said source means and said load means, said voltage drop appearing between the collector and emitter of said transistor, switch means connected to said transistor means for selectively eliminating the voltage drop between the collector and emitter of said transistor, said midpotential producing means including a voltage divider across said terminals of said source means and having a resistor connected to a first of the two terminals of said source means and constant potential means connected to a second of the two terminals of said source means and in series with said resistor to form a constant potential junction.

4. A counter-E.M.F. cell voltage control system for connection betweeen sourcce means having two terminals and load means and for regulating a voltage drop between said source and said load, comprising midpotential producing means adapted to be connected to said source means for obtaining potentials intermediate the potential of the two terminals of said source means, transistor means adapted to be connected between a first of the terminals of said source means and said load means including a collector connected to said source means, and an emitter connected to said load means and a base connected to an intermediate potential in said midpotential producing means for imposing between the source means and the load means a voltage drop when connected to said source means and said load means, said voltage drop appearing between the collector and emitter of said transistor, said midpotential producing means including a voltage divider across said terminals of said source means having a resistor connected to a second of the two terminals of said source means and constant potential means connected to said first of said terminals of said source means and in series with said resistor to form a constant potential junction, said constant potential means including a diode, said transistor means including a resistor connected in series with the collector, and switch means connected across said transistor means for selectively eliminating the potential drop between the collector and emitter of said transistor.

5. A counter-E.M.F. cell voltage control system for connection between source means having two terminals and load means and for regulating a voltage drop between said source and said load, comprising midpotential producing means adapted to be connected to said source means for obtaining a potential intermediate the potential of the two terminals of said source means, transistor means including a collector and an emitter defining an emitter-collector circuit adapted to be connected between said source means and said load means with the emitter connected to said load and including a base connected to an intermediate potential in said midpotential producing means and defining a base-emitter circuit with said emitter for biasing said transistor to impose between the source means and the load means a voltage drop when connected to said source means and said load means, said voltage drop appearing across the emitter-collector circuit of said transistor, switch means connected to said transistor means for substantially eliminating the voltage drop across the emitter-collector circuit of said transistor, said midpotential producing means including a diode adapted to be connected from a terminal of said source means and connected to said base.

6. A counter-E.M.F. cell voltage control system for connection between source means having two terminals and load means and for regulating a voltage drop between said source and said load, comprising mid-potential producing means adapted to be connected to said source means for obtaining potentials intermediate the potential of the two terminals of said source means, transistor means connected between said source means and said load means including a group of transistors each having a collector and an emitter which define respective emitter-collector circuits and having their respective emitter-collector circuits connected parallel to each other and poled so that the collectors of each of said transistors are adapted to be closer to said source than the respective emitters of said transistors, said transistor means including a collector resistor connected in series with each of said collectors and an emitter resistor in series with each of said emitters, each of said transistors having a base connected to said mid-potential producing means, each said base providing a voltage drop across the emitter-collector circuits of said transistors, and switch means connected across said transistor means for selectively eliminating the voltage drop across the emitter-collector circuits of said transistors.

7. A counter-E.M.F. cell voltage control system for connection between source means having two terminals and load means and for regulating a voltage drop between said source and said load, comprising biasing means adapted to be connected to said source means for obtaining potentials intermediate the potential of the two terminals of said source means, said biasing means including a voltage divider connected across the terminals of said source means and having a plurality of constant-potential diodes adapted to be connected from a first of said two terminals of said source means in series with each other and with a series resistor which is adapted to be connected to a second of said two terminals of said source means to provide a plurality of constant intermediate potentials, a group of transistors each having a collector and an emitter which define respective emitter-collector circuits and having their respective emitter-collector circuits connected and poled so as to form a unidirectional series path of major current flow between said source and load means, said transistors each having a base connected to a respective one of said midpotentials in said voltage divider, each said base providing a voltage drop across the emitter-collector circuits of said transistors, a plurality of resistors each connected in series with each of said collectors, and switch means connected across each collector-emitter circuit and corresponding collector resistor for selectively eliminating the voltage drops across the emitter-collector circuits of said transistors.

8. A counter-E.M.F. control system for connecting a direct voltage source having two terminals to a load and for regulating a voltage drop between said source and said load, comprising a plurality of transistors having respective emitters and collectors forming emitter-collector circuits and respective bases, said emitter-collector circuits being connected in parallel between said source and said load, respective collector resistors connected in series with each of said transistors, said emitters being connected to the load, a plurality of constant potential members each connected from one of said respective bases to a terminal of said source for providing a voltage drop across the emitter-collector circuits of said transistors, and means for selectively eliminating the voltage drop across the emitter-collector circuits of said transistors.

9. A counter-E.M.F. control system for connecting a direct voltage source having two terminals to a load and for regulating a voltage drop between said source and said load, comprising a plurality of transistors having respective emitters and collectors forming emitter-collector circuits and respective bases, said emitter-collector circuits being connected in parallel between said source and said load, respective collector resistors connected in series with each of said transistors, said emitters being connected to the load, a plurality of constant potential members each connected from one of said respective bases to a terminal of said source, a resistor connecting each base and said constant potential member to the other terminal of said source for providing a voltage drop across the emitter-collector circuits of said transistors, and means for selectively eliminating the voltage drop across the emitter-collector circuits of said transistors.

References Cited by the Examiner
UNITED STATES PATENTS

| | | | |
|---|---|---|---|
| 2,917,700 | 12/1959 | Chase | 323—22 |
| 2,959,717 | 11/1960 | Conger | 317—148.5 |
| 2,963,637 | 12/1960 | Osborn | 323—22 |
| 2,980,826 | 4/1961 | Horton | 317—148.5 |
| 2,992,382 | 7/1961 | Hetzler | 323—22 |
| 3,047,776 | 7/1962 | Mauer | 307—88.5 |
| 3,049,632 | 8/1962 | Staples | 323—22 |
| 3,076,128 | 1/1963 | Toski et al. | 323—22 |

JOHN F. COUCH, *Primary Examiner.*

LLOYD McCOLLUM, MILTON O. HIRSHFIELD,
*Examiners.*

G. P. HAAS, D. L. RAE, H. B. KATZ, K. D. MOORE,
*Assistant Examiners.*